United States Patent [19]
Davis et al.

[11] Patent Number: 5,815,567
[45] Date of Patent: Sep. 29, 1998

[54] COMMUNICATIONS INTERFACE PROVIDING ISOLATION AND RINGDOWN FEATURES

[75] Inventors: Jeffrey P. Davis, Ham Lake; Duane Francis Wald, Plymouth; Timothy D. Gunn, Mounds View, all of Minn.

[73] Assignee: Multi-Tech Systems, Inc., Mounds View, Minn.

[21] Appl. No.: 656,167

[22] Filed: May 31, 1996

[51] Int. Cl.[6] .................................................. H04M 3/22
[52] U.S. Cl. .................. 379/377; 379/379; 379/393; 379/413; 363/16
[58] Field of Search .............. 379/377, 93, 399, 379/413, 405, 379, 393; 363/126, 125, 20, 21, 129, 16, 56, 98, 13, 15; 323/355, 357, 358

[56] References Cited

U.S. PATENT DOCUMENTS

| | | |
|---|---|---|
| 4,315,106 | 2/1982 | Chea, Jr. ................................ 379/413 |
| 4,754,385 | 6/1988 | McDade et al. ........................ 363/16 |
| 4,907,261 | 3/1990 | Chapman ................................ 379/234 |
| 5,216,704 | 6/1993 | Williams et al. ....................... 379/94 |
| 5,515,423 | 5/1996 | Beck et al. .............................. 379/93 |
| 5,600,715 | 2/1997 | Bingel .................................... 379/377 |
| 5,615,225 | 3/1997 | Foster et al. ............................ 370/241 |

Primary Examiner—Ahmad F. Matar
Assistant Examiner—Jacques M. Saint-Surin
Attorney, Agent, or Firm—Schwegman, Lundberg, Woessner & Kluth, P.A.

[57] ABSTRACT

A communications interface having an isolation circuit for signals from a plain old telephone set (POTS) device to communications electronics. The communications interface having an isolated power supply. The isolated power supply including a flyback transformer for a current loop supply and an isolated power source The telephone line isolation circuit having an optically isolated off-hook detection circuit and an isolation transformer for isolating communication electronics from the telephone current loop. The telephone line isolation circuit providing a ringing circuit for ringing a current loop device, such as a standard plain old telephone system (POTS) device.

20 Claims, 4 Drawing Sheets

COMMUNICATIONS INTERFACE PROVIDING ISOLATION AND RINGDOWN FEATURES

FIELD OF THE INVENTION

The present invention relates generally to isolation of communications devices, and in particular to a specialized communications interface to isolate plain old telephone set compatible devices from data communications equipment.

BACKGROUND OF THE INVENTION

Plain Old Telephone Set (POTS) devices have long been standardized to interface to a communications line using a DC current loop. A POTS device requires a DC source to provide a DC current loop. The current loop is complete when the POTS device is off-hook, since the device presents a low DC impedance to the DC source when off-hook. The current loop is opened when the device is placed on-hook, since the POTS device presents a high DC impedance to the DC source in the on-hook state.

The low impedance state completes the holding loop to indicate a valid POTS connection. After the call is completed the POTS device transitions to a high impedance value to show that the POTS device has "hung up" and that the communications have been terminated.

Present communications devices may not provide DC sources for communications with POTS devices and may operate using relatively low voltage supplies. A reduction in the operating voltage of electronics results in reduced power dissipation and power supply form factor requirements. As operating voltages decrease, so do the available noise margins and tolerances to voltage spiking.

On the other hand, POTS devices require DC holding loops which introduce relatively high power dissipation and also pose isolation design problems, since the loop contains a number of noise sources which degrade the overall signal to noise ratio of the system and provide an unwanted sources of voltage spikes.

Therefore, an advanced communications interface between communications electronics and POTS devices is needed in the art. The communications interface should provide a loop holding circuit compatible with current loops used with POTS devices. The communications interface should also operate using reduced supply voltages to be compatible with existing low power designs, and the interface should isolate the communications electronics and their power supplies from the POTS device.

SUMMARY OF THE INVENTION

The present communications interface provides a DC current source and loop holding circuit for a POTS device. In one embodiment the communications interface isolates the communications electronics from the POTS device. In one embodiment a DC-DC converter circuit which incorporates the flyback conversion technique is employed to provide a current source for the DC holding loop current. In one embodiment the current source is isolated from the low voltage power supplies to maintain noise immunity to the low voltage power supplies. One embodiment provides an off-hook detect circuit to detect when the DC holding loop is engaged. Another embodiment provides a ringing electronics for ringing the POTS device (i.e., generating a ringdown signal) upon command by the communication electronics. Controls are provided to ensure that the interface is not generating a ringing signal when the POTS device is off-hook. Other embodiments are described which provide alternate control means for coordinating operation of the communications interface.

BRIEF OF THE DRAWING

In the drawings, where like numerals describe like components throughout the several views.

DETAILED DESCRIPTION

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

Figure 1:
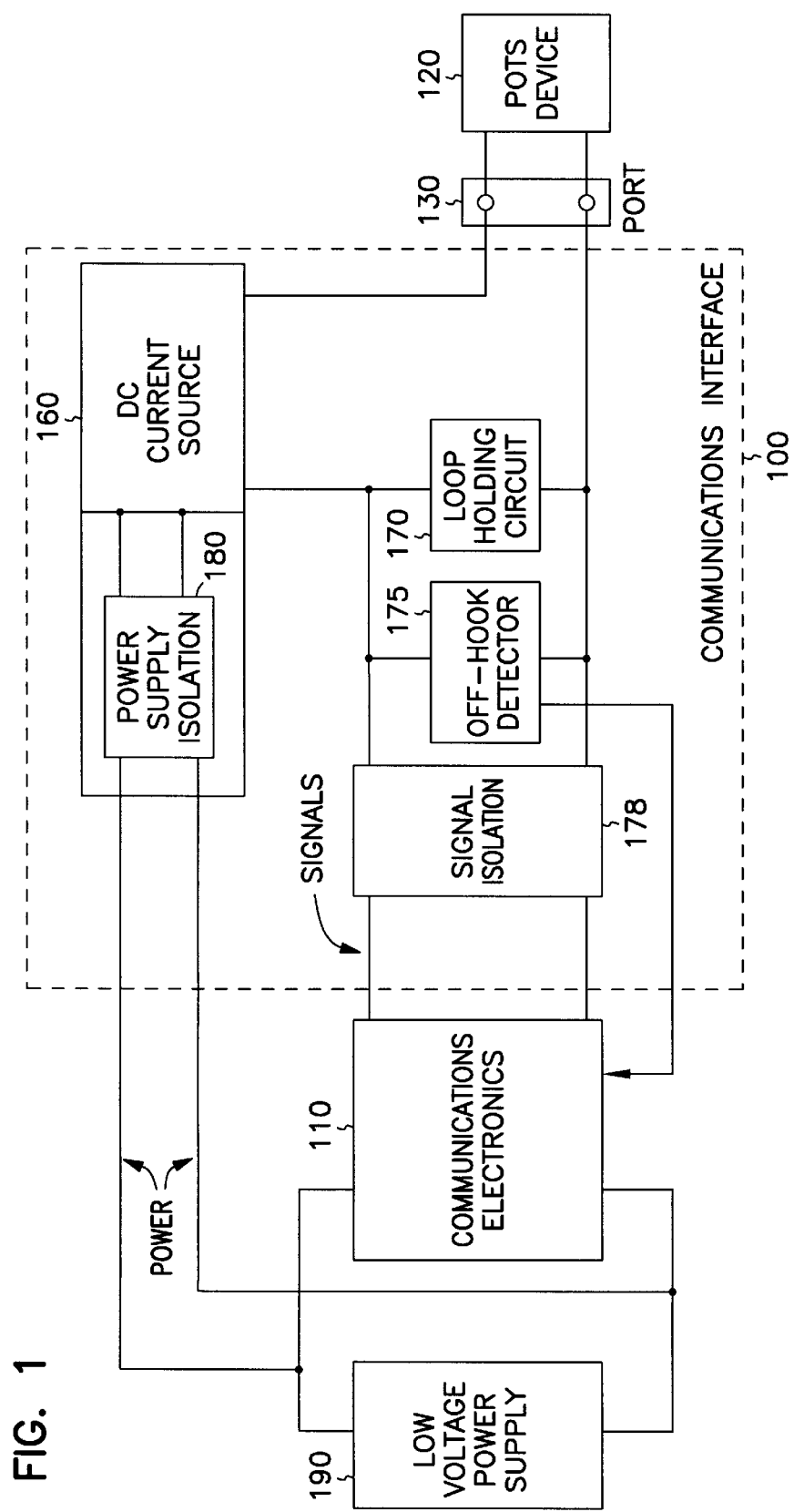
FIG. 1 is a block diagram of an isolated communications interface.

FIG. 1 is a block diagram of one embodiment of an isolated communications interface 100 for communication between communications electronics 110 and plain old telephone system (POTS) device 120. For example, communications electronics 110 may contain a receiver and a transmitter for transceiving analog data between POTS device 120 and communications electronics 110. For example, assume that POTS device 120 is a standard telephone. In this case, when the POTS device is off-hook, current source 160 and loop holding circuit 170 provide a current loop for the POTS device. The current source 160 is isolated from the low voltage power supply 190 using power supply isolation 180. This provides DC isolation between the low voltage power supply 190 and current source 160. The off-hook condition of the POTS device 120 is sensed by off-hook detector 175 and a signal is sent to communications electronics 110.

Current source 160 and loop holding circuit 170 engage POTS device 120 by providing a 24 volt 20 milliamp DC current loop. AC signals originating at POTS device 120 are passed through port 130 and reach communications electronics 110 via signal isolation 178. The loop holding circuit 170 provides a low impedance path for DC signals and a high impedance path to the AC signals. In one embodiment, DC signals are blocked from passing through signal isolation circuit 178 using a blocking capacitor. AC signals are passed through a low impedance path in the current source 160, but do not pass through loop holding circuit 170. Thus the AC signals from the POTS device 120 are presented to signal isolation circuit 178, and ultimately communications electronics 110, via the DC current source 160. AC signals are also communicated by communication electronics 110 to POTS device 120 over the same path, therefore the device in this mode of operation is bidirectional.

Therefore, communications interface 100 provides signal isolation and power supply isolation to the POTS device 120 using the interface 100.

Another example of communication between communication electronics 110 and POTS device 120 is the transfer of digital data. For example, POTS device 120 could be a conventional ISDN modem which is connected to port 130 to communicate with communication electronics 110.

Other POTS devices 120 and communications electronics 110 may be used in alternate embodiments and applications without departing from the scope and spirit of the present invention.

Figure 2:
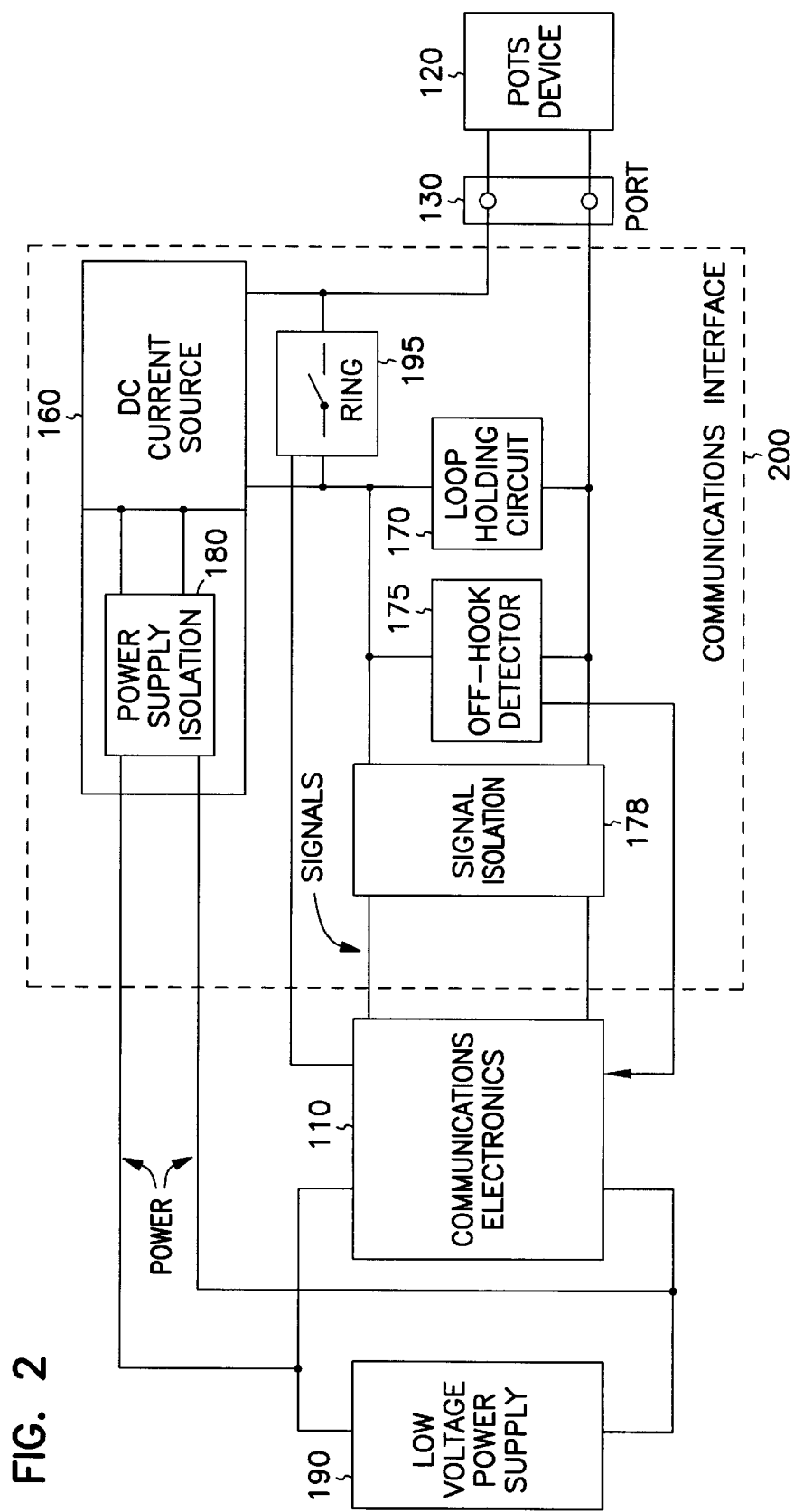
FIG. 2 is a block diagram of an isolated communications interface having a ringdown signal generation circuit.

FIG. 2 shows an alternate embodiment of the communications interface 200 whereby a ringing circuit 195 is introduced into the system to provide a ringing signal to POTS device 120 upon command by communication electronics 110.

Figure 3:
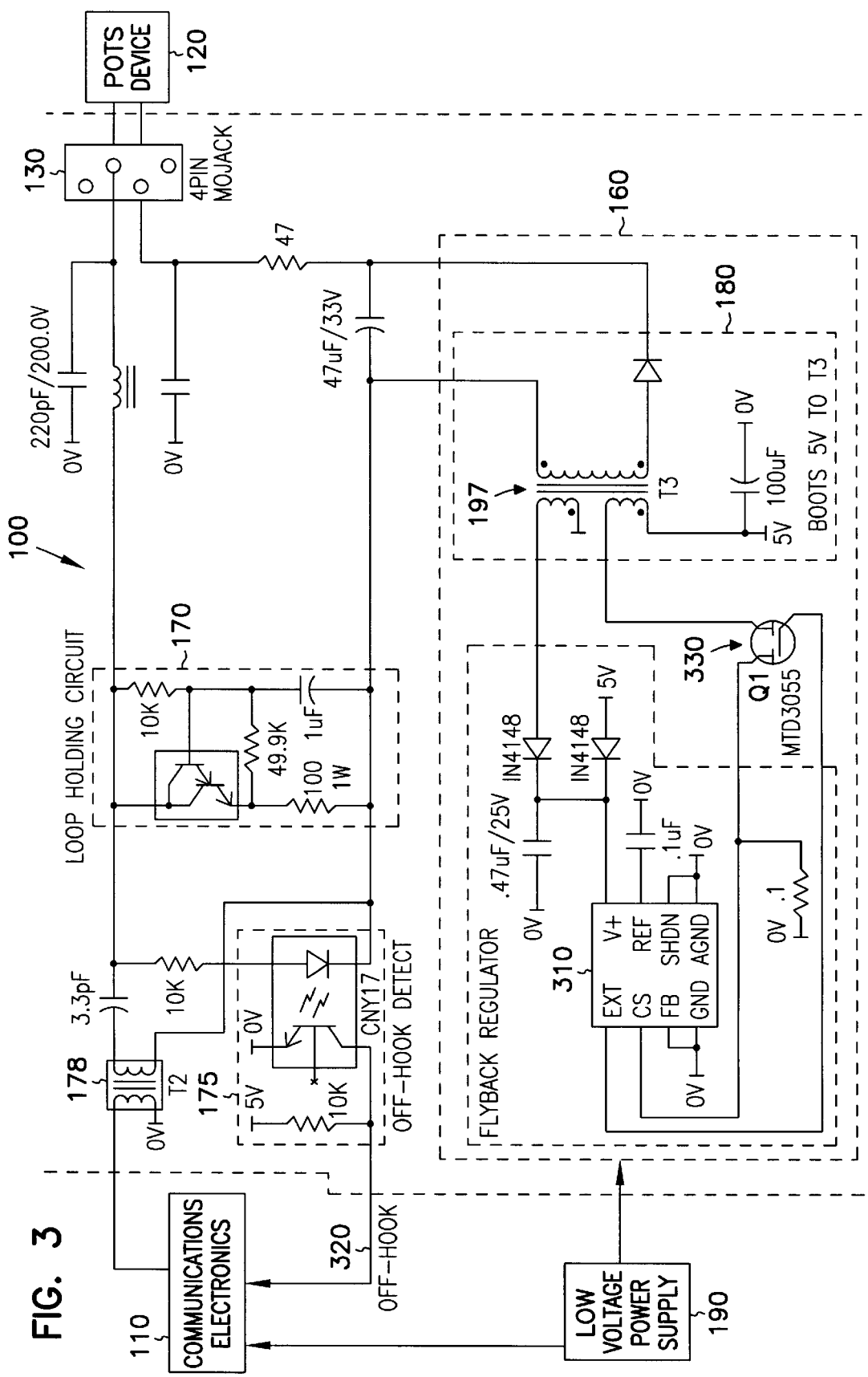
FIG. 3 is a schematic diagram of one embodiment of the isolated communications interface of FIG. 1.

FIG. 3 shows a schematic diagram of the telephone line isolation circuit of FIG. 1. In this embodiment of the communications interface 100, signal isolation circuit 178 is a transformer, and off-hook detect circuit 175 uses an optoisolated amplifier for generating off-hook signal 320, which is received by communications electronics 110. Current source 160 comprises a DC-DC convertor using a flyback transformer 180 for generating a 24 volt DC output from a 5 volt DC input. A tertiary coil of transformer 180 is used to sense the voltage generated in the DC loop. The DC voltage generated by the tertiary coil of transformer 180 is used by the oscillation chip 310, a MAXIM MAX 1771 in this embodiment. The oscillation chip 310 activates switch 330 based on the DC voltage received from the tertiary coil of transformer 180. Thus, the switching frequency of the oscillating chip regulates the 24 volt DC output of transformer 180. Transformer 180 provides isolation from the low voltage power supply 190. Furthermore, switch 330 is also isolated.

The turns ratio of the tertiary winding with respect to the primary winding with respect to the primary winding and secondary windings, ensure that the secondary windings to be +90 V DC and −24 V DC after rectification and filtering.

Figure 4:
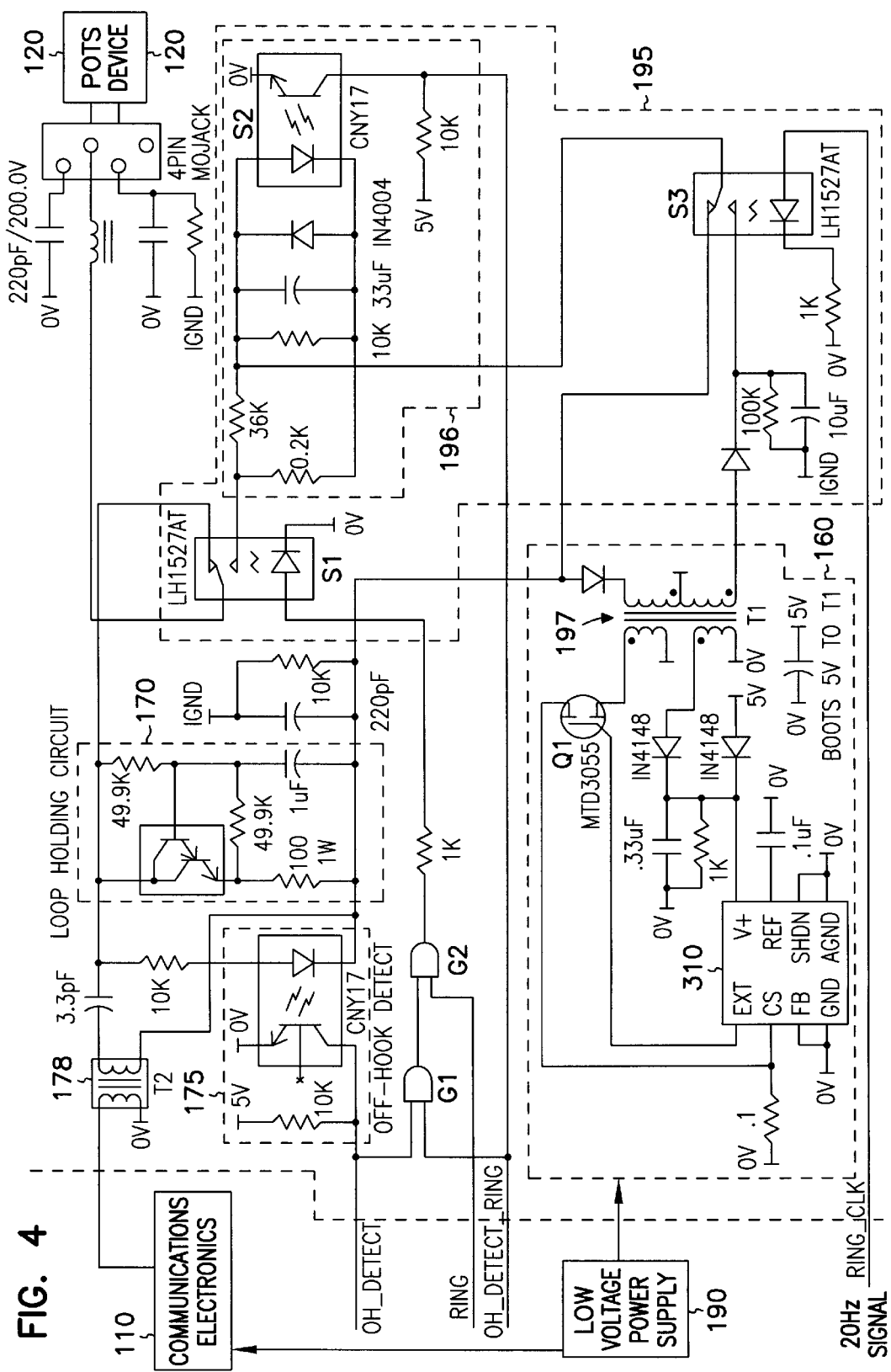
FIG. 4 is a schematic diagram of one embodiment of the isolated communications interface of FIG. 2.

FIG. 4 is a schematic diagram of the embodiment shown in FIG. 2 whereby a ringing circuit 195 is introduced to provide a ringing signal to POTS device 120.

In this embodiment, off-hook detector 175 outputs a logic high signal when the POTS device 120 is on-hook and a logic low signal when the POTS device 120 is placed off-hook. Loop holding circuit 170 maintains a telephone connection by controlling the amount of current supplied by current source 160 when POTS device 120 is off-hook (a low impedance state). The two-input AND gates G1 and G2 provide control of the ringing function to prevent transmitting a ringdown signal to POTS device 120 when it is off-hook.

A ringdown signal is produced by asserting a logic high input to the RING input and a 20 Hz signal into the RING_CLK input. However, ringdown is inhibited unless the OH_DETECT signal from the off-hook detector 175 is logic high, indicating that the POTS device 120 is on hook, and the OH_DETECT_RING signal is logic high. The OH_DETECT_RING signal is controlled by the check current circuit 196, which is used to inhibit ringing when the POTS device 120 is taken off-hook during a ringing operation. The optoisolated switch S2 is activated when switch S1 is energized with a ringdown signal from G1 and G2. FIG. 4 shows the normal position of optoisolated switches S1 and S3. To transmit a ringdown signal to POTS device 120, the RING input is activated (logic high) and a 20 Hz signal is input into the RING_CLK input. Provided that OH_DETECT is logic high (no call is in place, no current loop established) and that OH_DETECT_RING is logic high (POTS device 120 has not been taken off-hook during a ringing), the RING signal will propagate through gate G2 to activate switch S1. Furthermore, switch S3 is toggled by the RING_CLK signal. Center-tapped transformer 197 provides power supply isolation 180, as shown in FIG. 2, and provides a ringing signal by toggling switch S3 in a push/pull configuration.

After the POTS device 120 is taken off-hook, the ringing is complete and switches S1 and S3 return to their first state, as shown in FIG. 4, to conduct communications between communications electronics 110 and POTS device 120. As the POTS device 120 is taken off-hook the loop holding circuit 170 is activated to maintain the current loop.

Alternate embodiments employ a microcontroller to perform the control operations of gates G1 and G2. Other control electronics may be used without departing from the scope and spirit of the present invention.

The present interface may be used for interfacing a standard telephone to a modem, or for interfacing any other POTS-compatible device to a modem or personal communications system. The present interface may also provide an interface between any POTS-compatible device and a personal computer or laptop computer. The present interface also has applications in analog or digital recording applications where a POTS-compatible device is employed. The present interface also provides an interface to a cellular phone to provide a POTS device connection. Furthermore, the present interface is used with cellular modems to provide a POTS-compatible device input. Furthermore, the present invention may interface any type of communications electronics to any POTS-compatible telephone service.

The present interface has been described in terms of isolating a current loop device from communication electronics, however, there are several applications of this interface which are not described herein. For example, current source 160 may be designed such that the primary winding voltage is monitored for correct output voltage, thus eliminating the need for the tertiary winding. In one embodiment, a "Buck" configuration is incorporated, eliminating the need for a tertiary winding. In an alternate embodiment, the analog portion (i.e., the AC component) of the signals originating at the POTS device may be passed to the communication electronics 110 without isolation.

CONCLUSION

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. For example, particular voltages are described in this specification, however the voltages may be increased or decreased and circuit configurations may vary without departing from the scope and spirit of the present invention.

Those with skill in the electrical, computer, and telecommunications arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

What is claimed is:

1. A communications system, comprising:

communications electronics, connected to a signal isolation circuit;

a current source, connected to a low voltage power supply via power supply isolation circuit; and a loop holding circuit and an off-hook detector, connected to a port, the loop holding circuit connected to the current source and to the signal isolation circuit and providing a holding current to a device connected to the port using current from the current source and providing a signal path between the communication electronics and the device connected to the port.

2. The communications system of claim 1, wherein the current source comprises a DC to DC converter.

3. The communications system of claim 1, wherein the current source comprises a flyback transformer, connected to a flyback regulator, wherein the power supply isolation circuit comprises a portion of the flyback transformer.

4. The communications system of claim 3, wherein the flyback transformer comprises a tertiary winding to provide isolated voltage feedback to the flyback regulator.

5. The communications system of claim 4, wherein the signal isolation circuit is a transformer.

6. The communications system of claim 5, further comprising a ringing circuit.

7. The communications system of claim 4, further comprising a ringing circuit.

8. The communications system of claim 1, wherein the signal isolation circuit is a transformer.

9. The communications system of claim 1, further comprising a ringing circuit.

10. The communications system of claim 1, wherein the communications electronics comprise a modem.

11. The communications system of claim 1, wherein the port is connected to a POTS compatible device.

12. The communications system of claim 1, wherein the port is connected to a telephone.

13. A communications interface , comprising:

a port for connections to a plain old telephone system (POTS) device;

a current source providing a current for a loop holding circuit connected to the port;

a power supply isolation circuit connecting the current source to a low voltage power supply;

a signal isolation circuit connecting communications electronics to the port;

a loop holding circuit connected to the port; and an off-hook detector connected to the port.

14. The communications interface of claim 13, wherein the current source comprises a DC to DC converter.

15. The communications interface of claim 13, wherein the current source comprises a flyback transformer, connected to a flyback regulator, wherein the power supply isolation circuit comprises a portion of the flyback transformer.

16. The communications interface of claim 15, wherein the flyback transformer comprises a tertiary winding to provide isolated voltage feedback to the flyback regulator.

17. The communications interface of claim 16, wherein the signal isolation circuit is a transformer.

18. The communications interface of claim 16, further comprising a ringing circuit.

19. The communications interface of claim 13, wherein the signal isolation circuit is a transformer.

20. The communications interface of claim 13, further comprising a ringing circuit.

* * * * *